US012760185B2

(12) United States Patent
Hörsting et al.

(10) Patent No.: US 12,760,185 B2
(45) Date of Patent: Oct. 13, 2026

(54) GRANULATE AND COATING AGENT PRODUCED THEREFROM

(71) Applicant: Brillux GmbH & Co. KG, Münster (DE)

(72) Inventors: Ingo Hörsting, Drensteinfurt (DE); Jan Leusmann, Nottuln (DE); Georg Bender, Wallenhorst (DE); Jonas Berg, Münster (DE)

(73) Assignee: BRILLUX GMBH & CO. KG, Munster (DE)

( * ) Notice: Subject to any disclaimer, the term of this patent is extended or adjusted under 35 U.S.C. 154(b) by 765 days.

(21) Appl. No.: 17/604,394

(22) PCT Filed: Apr. 20, 2020

(86) PCT No.: PCT/EP2020/060993
§ 371 (c)(1),
(2) Date: Oct. 15, 2021

(87) PCT Pub. No.: WO2020/212622
PCT Pub. Date: Oct. 22, 2020

(65) Prior Publication Data

US 2022/0213330 A1 Jul. 7, 2022

(30) Foreign Application Priority Data

Apr. 18, 2019 (DE) ......................... 102019110365.7
Jul. 8, 2019 (DE) ......................... 102019118429.0

(51) Int. Cl.

| | |
|---|---|
| ***C09D 5/02*** | (2006.01) |
| ***C09D 7/40*** | (2018.01) |
| ***C09D 7/61*** | (2018.01) |
| ***C09D 7/80*** | (2018.01) |

(52) U.S. Cl.
CPC ............. *C09D 5/027* (2013.01); *C09D 5/028* (2013.01); *C09D 7/61* (2018.01); *C09D 7/66* (2018.01); *C09D 7/70* (2018.01); *C09D 7/80* (2018.01)

(58) Field of Classification Search
CPC .......... C09D 5/00; C09D 5/027; C09D 5/028; C09D 7/61; C09D 7/66; C09D 7/70; C09D 5/02; C09D 7/80
See application file for complete search history.

(56) References Cited

U.S. PATENT DOCUMENTS

| | | | |
|---|---|---|---|
| 2,323,550 A | 7/1943 | Lukens | |
| 2,713,545 A | 7/1955 | Kather | |
| 3,574,651 A | 4/1971 | Nitzsche et al. | |
| 3,895,956 A | 7/1975 | Yoshida et al. | |
| 3,923,704 A | 12/1975 | Gunning et al. | |
| 4,063,958 A | 12/1977 | Roth et al. | |
| 4,125,673 A | 11/1978 | Roth et al. | |
| 4,137,380 A | 1/1979 | Gunning et al. | |
| 4,743,199 A | 5/1988 | Weber et al. | |
| 5,356,463 A | 10/1994 | Kober et al. | |
| 5,584,921 A | 12/1996 | Wagner et al. | |
| 5,998,525 A | 12/1999 | Wang et al. | |
| 6,468,336 B1 | 10/2002 | Fiedler et al. | |
| 6,638,353 B1 | 10/2003 | Rathschlag et al. | |
| 7,789,959 B2 | 9/2010 | Fichtner et al. | |
| 9,334,196 B2 | 5/2016 | Connors, Jr. et al. | |
| 2005/0150417 A1 | 7/2005 | Hirsbrunner et al. | |
| 2006/0174922 A1 | 8/2006 | Mader | |
| 2009/0211491 A1 | 8/2009 | Ogata et al. | |
| 2010/0119850 A1 | 5/2010 | Browne et al. | |
| 2010/0126728 A1* | 5/2010 | Duenckel | C04B 35/62695 166/308.1 |
| 2010/0298472 A1* | 11/2010 | Bardelli | C09C 1/00 524/502 |
| 2013/0145966 A1 | 6/2013 | Schildbach et al. | |
| 2013/0170014 A1 | 7/2013 | Kong et al. | |
| 2019/0048214 A1 | 2/2019 | Hörsting et al. | |
| 2019/0144335 A1* | 5/2019 | Skorina | C04B 14/28 106/409 |
| 2022/0184257 A1 | 6/2022 | Hörsting et al. | |

FOREIGN PATENT DOCUMENTS

| | | |
|---|---|---|
| AU | 617422 | 11/1991 |
| CH | 618462 | 7/1980 |
| CN | 2335633 | 9/1999 |
| DE | 2745853 | 2/1979 |
| DE | 4424685 | 1/1996 |

(Continued)

OTHER PUBLICATIONS

Cancellation Request for DE 202017107111 Dated Dec. 21, 2018. (German Language—DE Family Member Publication).

(Continued)

*Primary Examiner* — Shuangyi Abu Ali
(74) *Attorney, Agent, or Firm* — Honigman LLP; Andrew N. Weber; Jonathan P. O'Brien

(57) ABSTRACT

Presented and described is a granulate for producing a coating agent, in particular a dispersion paint, wherein the granulate contains, in each case based on the total weight of the granulate, a) 2 to 60 wt. % binder, b) 5 to 85 wt. % pigment and/or filler and c) 1 to 15 wt. % additives. By adding water, it is possible to produce a coating agent, in particular a dispersion paint, using the granulate. The addition of water to the granulate and the production of coating agent, in particular the dispersion paint, preferably take place directly in the container in which the granulate is stored.

8 Claims, No Drawings

(56) References Cited

FOREIGN PATENT DOCUMENTS

| | | |
|---|---|---|
| DE | 19654829 | 6/1998 |
| DE | 1089356 | 1/2007 |
| DE | 102009026039 | 12/2010 |
| DE | 102014013455 | 3/2016 |
| DE | 202014011090 | 11/2017 |
| EP | 1297079 | 2/2003 |
| EP | 1541225 | 6/2005 |
| EP | 1259572 | 7/2005 |
| EP | 1990102 | 11/2008 |
| EP | 2243808 | 10/2010 |
| EP | 2905268 | 11/2011 |
| ES | 2351590 | 8/2011 |
| GB | 2121424 | 12/1983 |
| GB | 2292695 | 3/1996 |
| JP | 47-013184 | 7/1972 |
| JP | H04107824 | 4/1992 |
| JP | 07-278463 | 10/1995 |
| JP | 2005-139320 | 6/2002 |
| JP | 2005-336357 | 12/2005 |
| JP | 4562388 | 10/2010 |
| JP | 2011-079908 | 4/2011 |
| RU | 2142975 | 12/1999 |
| WO | 200068324 | 11/2000 |
| WO | 2001/048098 | 7/2001 |
| WO | 2005073257 | 8/2005 |
| WO | 2007080612 | 7/2007 |
| WO | 2017/144694 | 8/2017 |
| WO | 2020/165118 | 8/2020 |
| WO | 2020/212622 | 10/2020 |

OTHER PUBLICATIONS

International Search Report for PCT/EP2017/054386 Mailed May 15, 2017. (English Translation).
International Search Report for PCT/EP2020/053385. (German Language).
Written Opinion of the International Searching Authority for PCT/EP2017/054386 Mailed May 15, 2017. (English Translation).
International Search Report for PCT/EP2020/060993.

* cited by examiner

GRANULATE AND COATING AGENT PRODUCED THEREFROM

CROSS REFERENCE TO RELATED APPLICATIONS

This U.S. nonprovisional application is the 35 USC § 371 national phase of PCT Application No. PCT/EP2020/060993, filed on Apr. 20, 2020, which claims the benefit of DE Application No. 102019110365.7, filed on Apr. 18, 2019, and DE Application No. 102019118429.0, filed on Jul. 8, 2019. Each of these documents is hereby incorporated by reference in its entirety.

The invention relates to a granulate for producing a coating agent, in particular a dispersion paint, a method for producing the granulate, the use of the granulate for producing a coating agent, a coating agent produced by mixing the granulate with water, and a container, in particular a paint bucket, containing a granulate for producing a coating agent, in particular a dispersion paint, by mixing the granulate with water.

Coating agents such as dispersion paints for outdoors and indoors are known in principle to a person skilled in the art. Known coating agents of the type mentioned at the outset are offered in containers of different sizes, in particular in paint buckets. The disadvantage of the coating agents on the market is their high weight, which makes transportation difficult. For example, a 10-liter bucket of dispersion paint weighs approximately 15 kg, and a hand cart is therefore usually required for transport, in particular when transporting a plurality of buckets. A further disadvantage of known dispersion paints is that due to their high water content of up to 40 wt. %, they are susceptible to microbial infestation. For this reason, known dispersion paints usually contain preservatives in order to increase the storage stability (shelf life) of the coating agents. However, the addition of preservatives is undesirable for ecological and allergenic reasons, inter alia.

The object of the present invention is therefore that of improving the transportability of coating agents. Furthermore, the coating agents should in particular contain little or no preservatives. In addition, it should be possible to provide coating agents which are as homogeneous as possible, in particular as free from lumps as possible. Ideally, the coating agents should be in a form which is easy to transport and/or contains little or no preservatives and/or produces as little as possible or no dust and/or can also be used by consumers.

One or all of these objects are achieved according to the invention by a granulate for producing a coating agent, wherein the granulate, in each case based on the total weight of the granulate, contains a) 2 to 60 wt. % binder,
b) 5 to 85 wt. % pigment and/or filler,
c) 1 to 15 wt. % additives.

The granulate according to the invention is suitable for producing a coating agent, in particular a ready-to-use coating agent, wherein the preparation is carried out in a simple manner by adding water to the granulate and then optionally mixing the components, in particular mixing by stirring. According to a preferred embodiment of the invention, the water is added and the mixture is mixed directly in the container in which the granulate is delivered, for example in a paint bucket.

It has surprisingly been found that, using the aforementioned granulate, coating agents can be provided in a form that is easy to transport. In particular, consumers can produce substantially homogeneous coating agents from this granulate by adding water and optionally mixing. In particular, the greatly reduced amount of water in the granulate results in a weight saving of up to 40%. For example, a 10-liter bucket of commercially available coating agent weighs 15 kg; using the aforementioned granulate, the weight can be reduced to up to 9 kg. Such paint buckets can also be transported without a hand cart. The significant reduction in the amount of water in the granulate also means that the paint is less susceptible to microbial infestation. This allows the amount of preservatives to be reduced or dispensed with entirely.

The use of granulate, instead of powder, also greatly reduces the amount of dust generated. Furthermore, the use of granulate instead of powder ensures that the coating agent is mixed uniformly and quickly, with almost no clumping. Without wishing to be bound to a scientific theory, this seems to be due to the fact that the water can penetrate better between the cavities in the granulate and also into the granulate during mixing than in the case of a powder. As a result of this homogeneous distribution of the water, the water appears to enter the granulate in a uniform manner, the granulate being very easily swellable with water and disintegrating into the individual substances. Granulate also has a better flowability than powders. Granulate also has a higher bulk density than powders.

Surprisingly, the granulate according to the invention, containing, in each case based on the total weight of the granulate, 2 to 60 wt. % binder, 5 to 85 wt. % pigment and/or filler and 1 to 15 wt. % additives, is exceptionally stable and solid. Granulate having this ratio of binder, pigment and/or filler and additives shows little or no abrasion during transport and can be dispersed in water quickly and well. This effect seems to be due to the specific interaction of the various constituents in the granulate.

According to a preferred embodiment, the granulate according to the invention contains 3 to 50 wt. %, in particular 4 to 40 wt. %, 5 to 30 wt. %, 6 to 20 wt. %, 7 to 17 wt. %, 8 to 15 wt. % or 9 to 13 wt. %, binder, in each case based on the total weight of the granulate. Such a binder content has been found to be particularly advantageous for granulation and dispersion. In the case of such a binder content, the granulate is also particularly stable. In addition, the coating agent obtained after dispersion has particularly good wet abrasion resistance in the case of such a binder content.

The binder used in the granulate according to the invention should be easily granulated and redispersed. This is particularly the case for binders selected from the group consisting of poly(vinyl acetate-alkenoic acid) copolymers, such as poly(vinyl acetate-crotonic acid) copolymer, poly(vinyl acetate-olefin) copolymers, such as poly(ethylene vinyl acetate) copolymer, poly(vinyl acetate-vinyl chloride-ethylene) copolymer, poly(styrene-acrylic acid) copolymer, poly(acrylic acid) polymer, poly(vinyl acetate-vinyl ester-ethylene) copolymer, poly(vinyl chloride-ethylene) copolymer, poly(vinyl acetate-ethylene-methyl (meth)acrylate), poly(vinyl acetate-ethylene-acrylic acid ester) copolymer, poly(vinyl chloride-ethylene-vinyl laurate) copolymer, and mixtures thereof. The binders mentioned are particularly suitable for granulating the various components in the coating agent. In the case of the mentioned binders, a granulate is obtained that is stable and at the same time can be dispersed well in water.

According to a preferred embodiment of the invention, the binder has a minimum film-forming temperature MFT of less than 20° C., in particular less than 15° C., less than 10° C., less than 5° C. or of 0° C., measured according to Standard ISO 2115, in particular Standard ISO 2115:1996. Such a binder ensures that the coating agent obtained after dispersion of the granulate in water does not crack on the wall.

The granulate according to the invention preferably also contains 20 to 85 wt. %, in particular 20 to 75 wt. %, 25 to 70 wt. %, 30 to 60 wt. %, or 30 to 50 wt. %, filler, in each case based on the total weight of the granulate. In the case of such a proportion of filler in the granulate, a particularly cost-effective granulate is obtained that can be dispersed well.

The filler can be selected, for example, from the group consisting of dolomite, barium sulfate, feldspar, quartz, calcium carbonate, mica, kaolin, calcined kaolin, talc, plastics particles, clay, silica, diatomaceous earth, and mixtures thereof. These fillers distribute particularly uniformly in the aqueous coating agent during dispersion.

The granulate according to the invention preferably also has a water content of less than 5 wt. %, in particular less than 4 wt. %, less than 3 wt. %, less than 2 wt. %, less than 1 wt. % or less than 0.5 wt. %, based on the total weight of the granulate. The advantage of setting a water content of less than 5 wt. % is that the addition of preservatives can be dispensed with. In addition, granulate having such a low proportion of water has a particularly high storage stability.

The granulate according to the invention preferably also has an average particle size of 0.1 to 4 mm, in particular 0.2 to 3.5 mm, 0.3 to 3 mm, 0.4 to 2.5 mm, 0.5 to 2 mm, 0.7 to 1.8 mm or 0.8 to 1.5 mm. Granulate of this size has been found to be particularly suitable for dispersing in water. In this case of granulate of this size, the water can flow well between the granulate particles and at the same time interact sufficiently with the surface of the granulate for dispersion.

The average particle size of the granulate results from the particle size distribution of the granulate. The particle size distribution is determined in particular on the basis of the volume-equivalent spherical diameter of the particles, the volume-equivalent spherical diameter being the diameter of a theoretical sphere which has the same volume as the particle.

Methods for determining the average particle size are known to a person skilled in the art.

One possibility for determining the average particle size of the granulate according to the invention is to measure a statistically relevant sample of granulate particles, which were captured by means of light microscopy at a hundred-fold magnification, on a computer and to form the mean value from this sample. A high-precision light microscope such as the Digital Microscope VHX-500F from KEYENCE® can be used as the light microscope for this purpose, for example. The standard deviation within the sample can then be determined using the STDEV method. It has been found to be advantageous for the standard deviation to be less than 60% of the mean value, in particular less than 50% of the mean value. In the case of such a uniform particle size distribution, a particularly homogeneous and uniform paint is obtained during dispersion.

Alternatively, the $D_{50}$ value can denote the average particle size, for example. The $D_{50}$ value can in particular denote the size at which 50%, e.g. 50 wt. %, are smaller than the specified size. For example, 50%, e.g. 50 wt. %, of the particles would then pass through a theoretical mesh size. The average particle size, in particular the $D_{50}$ value, can be determined, for example, by creating a particle size distribution. The measurement can be carried out, for example, by means of light scattering, in particular by means of laser diffractometry or photon correlation spectroscopy. The average particle size, in particular the $D_{50}$ value, can in particular be measured in a gaseous medium, for example in air. For example, a Malvern Mastersizer 2000 or 3000 can be used to determine the average particle size, in particular the $D_{50}$ value. Further possibilities for determining the average particle size, in particular the $D_{50}$ value, are light and/or laser diffraction. The average particle size, in particular the $D_{50}$ value, can also be determined by means of sieve experiments.

In principle, the granulate according to the invention can be present in very different forms. For example, the granulate can have a cylindrical shape, a spherical shape, a lenticular shape, a rectangular shape, a cube shape or a prismatic shape. For the subsequent dispersion, however, it has been found to be particularly advantageous for the granulate according to the invention to be substantially spherical. In this case, the water can flow particularly well between the granulate particles to the bottom of the container, as a result of which a particularly uniform coating agent is obtained.

It is also advantageous for the granulate according to the invention to have a bulk density of 0.5 to 1.8 g/ml, in particular 0.6 to 1.5 g/ml or 0.9 to 1.1 g/ml, measured according to DIN ISO 697, in particular DIN ISO 697:1984-01. In this way, particularly rapid and homogeneous mixing of the granulate with water can be achieved without the formation of lumps. In addition, in the case of such a bulk density, the granulate is particularly space-saving, as a result of which the storage and transport of the material are improved.

Methods for determining the bulk density are known to a person skilled in the art. For example, the bulk density can be measured according to the DIN ISO 697 standard using a bulk density measuring device type SMG 697 with a 500 ml measuring cup from Powtec® Maschinen and Engineering GmbH.

The granulate according to the invention preferably contains 5 to 60 wt. %, in particular 15 to 30 wt. %, pigment, in each case based on the total weight of the granulate. This proportion of pigment can be incorporated very easily into granulate. In addition, in the case of such a proportion of pigment in the granulate, a coating agent having excellent optical properties can be produced.

Suitable pigments can be selected, for example, from the group consisting of titanium dioxide, iron oxide yellow, arylide (monoazo), bismuth vanadate, (di)arylides, azo condensation pigments, pyranthones, isoindolines, anthraquinones, derivatives of dioxazines, perinones, naphthol AS derivatives, perylenes, indanthrenes, phthalocyanines, rutile tin zinc, quinacridones, diketopyrrolopyrrole, iron oxide red, phthalocyanine blue, dioxazine, cobalt blue, ultramarine blue, phthalocyanine green, chromium oxide green, cobalt green, carbon black, iron oxide black, pyrazoloquinazolone, naphthol AS monoazo pigment, pigment violet 23, and mixtures thereof. These pigments are very suitable for redispersing the granulate in water and result in coating agents which have attractive optical properties. Said pigments also make a wide range of different colors and color combinations possible.

The granulate according to the invention can also contain at least one additive from the group consisting of wetting agents and dispersants, defoamers, rheological additives, anti-floating agents, leveling agents, lubricants, swelling agents and matting agents. Coating agents having good coating properties and good applicability can be obtained from the granulate by means of additives from said group.

In addition, the stability of the granulate can be increased by means of additives from said group.

The granulate according to the invention preferably contains no preservatives or is substantially free from preservatives. In this way, a coating agent is obtained from the granulate that meets particularly high environmental requirements.

According to a preferred embodiment, the granulate according to the invention substantially consists of 2 to 60 wt. % binder, 5 to 85 wt. % pigment and/or filler and 1 to 15 wt. % additives, in each case based on the total weight of the granulate. When it is stated that the granulate consists substantially of the aforementioned constituents, this means that at least 95 wt. %, in particular at least 97 wt. %, preferably at least 98 wt. % or more preferably at least 99 wt. % of the granulate, in each case based on the total weight of the granulate, consists of the aforementioned constituents. It is particularly advantageous for the 1 to 15 wt. % of additives to consist of rheology additives, wetting agents, dispersants, defoamers, leveling agents, lubricants and/or swelling agents. These granulates can be dispersed particularly well with water to form coating agents which can be easily applied.

According to another embodiment, the granulate according to the invention consists of 2 to 60 wt. % binder, 5 to 85 wt. % pigment and/or filler and 1 to 15 wt. % additives, in each case based on the total weight of the granulate.

The invention also relates to a method for producing a granulate comprising at least the steps of

- a. providing an aqueous dispersion containing, in each case based on the solids content of the dispersion,
  - i. 2 to 60 wt. % binder,
  - ii. 5 to 85 wt. % pigment and/or filler,
  - iii. 1 to 15 wt. % additives, and
- b. granulating the dispersion provided in a. to form a granulate,
- c. setting the water content of the granulate to less than 5 wt. %, based on the total weight of the granulate.

The aqueous dispersion in step a. of the method according to the invention preferably contains 40 to 80 wt. % water, based on the total weight of the dispersion. This proportion of water allows the dispersion to be granulated particularly well.

According to a preferred embodiment of the method according to the invention, the water content is set according to method step c. in the course of the granulating in method step b. In this way, the water content can be set in a technically simple and cost-effective manner.

The water content of the granulate in the method according to the invention is preferably set to less than 4 wt. %, less than 3 wt. %, less than 2 wt. %, less than 1 wt. % or less than 0.5 wt. %, based on the total weight of the granulate. Granulates having such a low proportion of water have a particularly high storage stability.

The aqueous dispersion in step a. of the method according to the invention preferably has a solids content of 20 to 60 wt. %, in particular 30 to 50 wt. % or 35 to 45 wt. %, based on the total weight of the dispersion. In this way, uniform and stable granulates can be obtained and irregularities do not occur during granulation.

According to a particularly preferred embodiment of the method according to the invention, the granulating the dispersion provided in a. takes place by means of spray granulation. In this way, a dust-free granulate is obtained, which is characterized by a compact and solid structure. As a result of the uniform growth of granulate in spray granulation, the formation of particularly homogeneous granulate particles can be achieved. The size and size distribution of the granulate particles can also be set particularly well by means of spray granulation.

In a very particularly preferred embodiment of the method according to the invention, the granulating takes place by means of spray granulation in a fluidized bed reactor. By means of this particularly preferred embodiment, a particularly stable and homogeneous granulate is obtained. The granulate growth can be controlled and modified particularly well in the fluidized bed. In addition, a low water content or low residual moisture can be set very efficiently by means of spray granulation in the fluidized bed reactor.

Particularly good results can be achieved if the spray granulation is carried out such that the exhaust air temperature in the fluidized bed reactor is less than 100° C., in particular less than 50° C. or less than 35° C. This ensures that the granulate cannot soften in the fluidized bed reactor.

According to a further advantageous embodiment of the method according to the invention, the product temperature in the fluidized bed reactor is less than 80° C., in particular less than 50° C. or less than 35° C. At such a product temperature, the granulate is particularly stable and no softening of the granulate occurs.

According to a further preferred embodiment, the supply air temperature in the fluidized bed reactor is 30 to 150° C., in particular 50 to 100° C. or 60 to 80° C. At such a supply air temperature, the forming granulate is efficiently dried in the fluidized bed reactor without the binder in the granulate being partially softened.

It has been found that the granulation of the aqueous dispersion provided in a. is particularly successful when the exhaust air temperature, the supply air temperature and the product temperature are selected in the preferred ranges described. In this way, uniform granulation and precise setting of the water content of the granulate can be achieved. In the case of said temperature parameters, the granulate can be dried particularly well and the granulate particles do not adhere to the walls of the fluidized bed reactor in an undesirable manner.

The binder used in the method according to the invention preferably has a minimum film-forming temperature MFT of less than 20° C., in particular less than 15° C., less than 10° C., less than 5° C. or of 0° C., measured according to Standard ISO 2115. Binders having such a minimum film-forming temperature are particularly suitable for the method according to the invention. Such binders ensure that the granulates are particularly uniform and that no irregularities can occur in the granulates during granulation.

In addition, what has been stated above in relation to the granulate according to the invention applies to the method according to the invention, in particular to the ingredients to be used.

A coating agent, in particular a dispersion paint, can be produced in a particularly simple manner using the granulate according to the invention. All that is required is to add water and then mix the granulate and water. The invention therefore also relates to a method for producing a coating agent comprising at least the steps of

- a. providing the granulate according to the invention and
- b. mixing the granulate with water to produce the coating agent.

The weight ratio of granulate to water is preferably from 10:90 to 90:10, in particular from 20:80 to 80:20 or from 30:70 to 70:30 or from 50:50 to 65:35. In the case of such weight ratios of granulate to water, a coating agent which is particularly easy to apply is obtained.

The present invention also relates to the use of a granulate according to the invention for producing a coating agent, the coating agent being in particular a dispersion paint.

The addition of water to the granulate and the mixing of the coating agent preferably take place in a suitable container, in particular in a paint bucket. Said container is preferably the container in which the granulate according to the invention is also sold. The invention accordingly also relates to a container, in particular a paint bucket, containing granulate according to the invention. According to a preferred embodiment of the invention, the container is dimensioned such that it is suitable for receiving water and mixing a coating agent. More preferably, the container should be closable in a substantially airtight manner, in particular re-closable, and suitable for storing the coating agent. To facilitate the determination of the amount of water required to mix the coating agent, the container, in particular the re-closable paint bucket, can have a marking which indicates the fill level of the water to be introduced, for example in the form of a fill line. In this way, a particularly simple and user-friendly mixing of the coating agent is made possible.

The invention is explained in more detail below by means of an example, which, however, is only used for illustrative purposes and is not limiting.

EXAMPLE

An aqueous component A was prepared and mixed using the ingredients listed in Table 1.

TABLE 1 amounts in each case based on the total weight of component A

| Ingredient | Amount in wt. % |
|---|---|
| Water | 38.15 |
| Filler | 45.51 |
| Pigment | 12.36 |
| Wetting agent | 0.34 |
| Defoamer | 0.28 |
| Rheology additive | 3.36 |

The aqueous binder component B was then provided using the ingredients listed in Table 2.

TABLE 2 amounts in each case based on the total weight of component B

| Ingredient | Amount in wt. % |
|---|---|
| Water | 50 |
| Binder (based on a copolymer of vinyl acetate and ethylene) | 50 |

Components A and B were introduced into a further amount of water, wherein 6.16 kg of component A, 0.84 kg of component B and 1.26 kg of water were used. This mixture was then spray granulated in a fluidized bed reactor, the supply air temperature being 60 to 80° C., the exhaust air temperature being 40 to 45° C. and the product temperature being less than 40° C. The product dried and granulated well, no softening of the product could be observed. 3.0 kg of a granulate having an average particle size of 0.311 mm and a residual moisture content of less than 1 wt. %, based on the total weight of the granulate, was obtained.

The granulate obtained in this way was then placed in a paint bucket and 2 kg of water was poured onto the 3 kg of granulate in the paint bucket. The water could distribute well between the granulate particles. The mixture was then manually stirred twice. Immediately after stirring, the obtained dispersion paint could be picked up with a paint brush and used to paint a surface.

The invention claimed is:

1. A granulate for producing a coating agent, wherein the granulate is obtained by spray granulation and is substantially spherical, and wherein the granulate, in each case based on a total weight of the granulate, comprises:

a) 3 to 50 wt % binder;

b) 15 to 30 wt % pigment;

c) 25 to 70 wt % filler; and d) 1 to 15 wt % additives, wherein the binder is selected from the group consisting of poly(vinyl acetate-alkenoic acid) copolymers, poly (vinyl acetate-olefin) copolymers, poly(vinyl acetate-vinyl chloride-ethylene) copolymer, poly(styrene-acrylic acid) copolymer, poly(acrylic acid) polymer, poly(vinyl acetate-vinyl ester-ethylene) copolymer, poly(vinyl chloride-ethylene) copolymer, poly(vinyl acetate-ethylene-methyl (meth)acrylate), poly(vinyl acetate-ethylene-acrylic acid ester) copolymer, poly (vinyl chloride-ethylene-vinyl laurate) copolymer, and mixtures thereof, and wherein the filler is selected from the group consisting of dolomite, feldspar, quartz, calcium carbonate, mica, kaolin, calcined kaolin, talc, plastics particles, clay, silica, diatomaceous earth, and mixtures thereof.

2. The granulate according to claim 1, wherein the binder has a minimum film-forming temperature MFT of less than 20° C. measured according to Standard ISO 2115.

3. The granulate according to claim 1, wherein based on the total weight of the granulate, the granulate has a water content of less than 5 wt %.

4. The granulate according to claim 1, wherein the granulate has an average particle size of 0.1 to 4 mm.

5. The granulate according to claim 1, wherein the granulate has a bulk density of 0.5 to 1.8 g/ml measured according to DIN ISO 697.

6. The granulate according to claim 1, wherein the pigment is selected from the group consisting of titanium dioxide, iron oxide yellow, arylide (monoazo), bismuth vanadate, (di) arylides, azo condensation pigments, pyranthones, isoidolines, anthraquinones, derivatives of a dioxazines, perinones, naphthol AS derivatives, perylenes, indanthrenes, phthalocyanines, rutile tin zinc, quinacridones, diketopyrrolopyrrole, iron oxide red, phthalocyanine blue, dioxazine, cobalt blue, ultramarine blue, phthalocyanine green, chromium oxide green, cobalt green, carbon black, iron oxide black, pyrazoloquinazolone, naphthol AS monoazo pigment, pigment violet 23, and mixtures thereof.

7. The granulate according to claim 1, wherein the granulate contains at least one additive from the group consisting of wetting agents and dispersants, defoamers, rheological additives, anti-floating agents, leveling agents, lubricants, swelling agents, and matting agents.

8. The granulate according to claim 1, wherein the granulate is substantially free from preservatives.

* * * * *